Oct. 8, 1963 W. C. HARRIS ETAL 3,106,173
DEPOSITOR
Filed Nov. 15, 1960 3 Sheets-Sheet 3
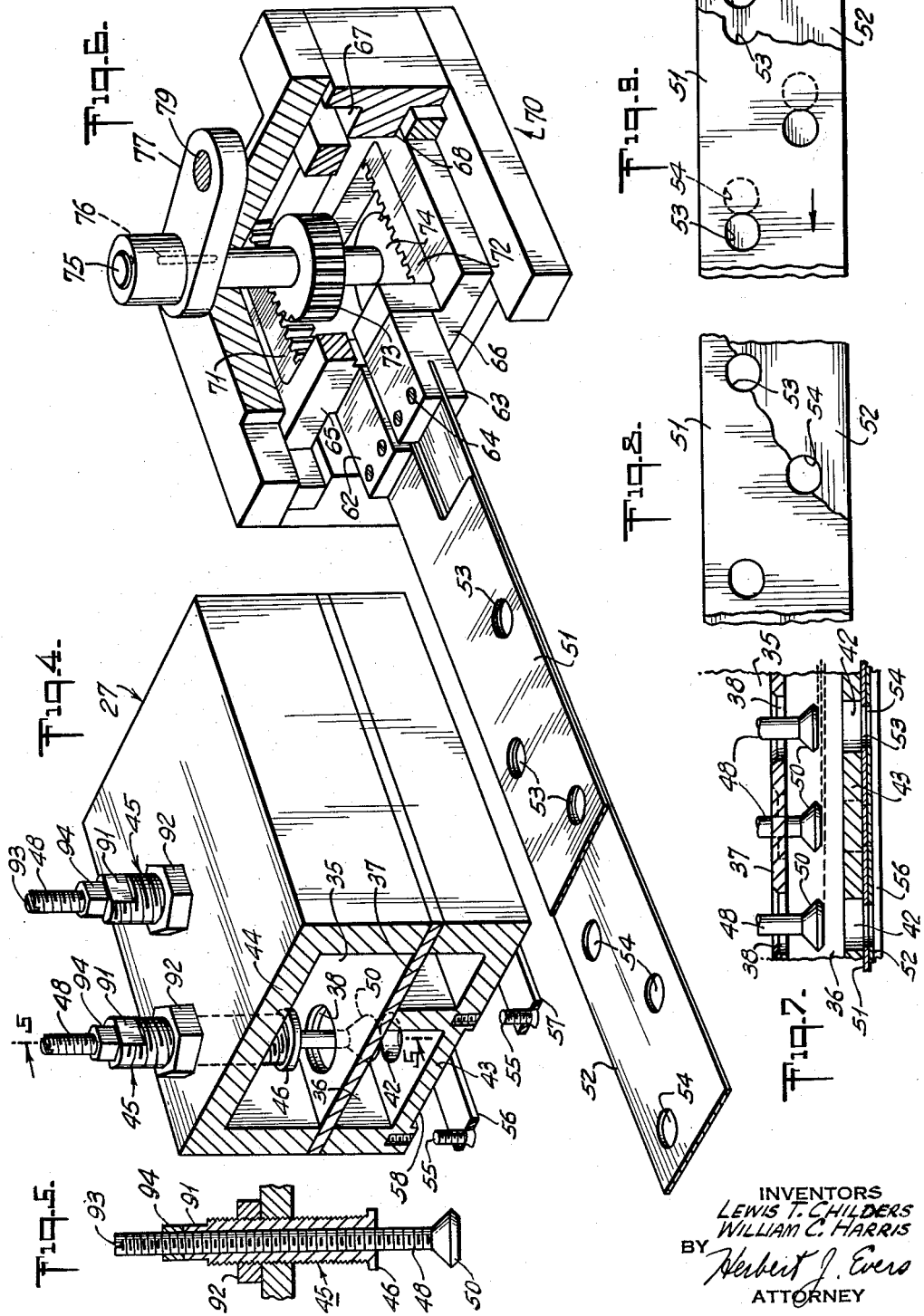
INVENTORS
LEWIS T. CHILDERS
WILLIAM C. HARRIS
BY Herbert J. Evers
ATTORNEY though any other suitable

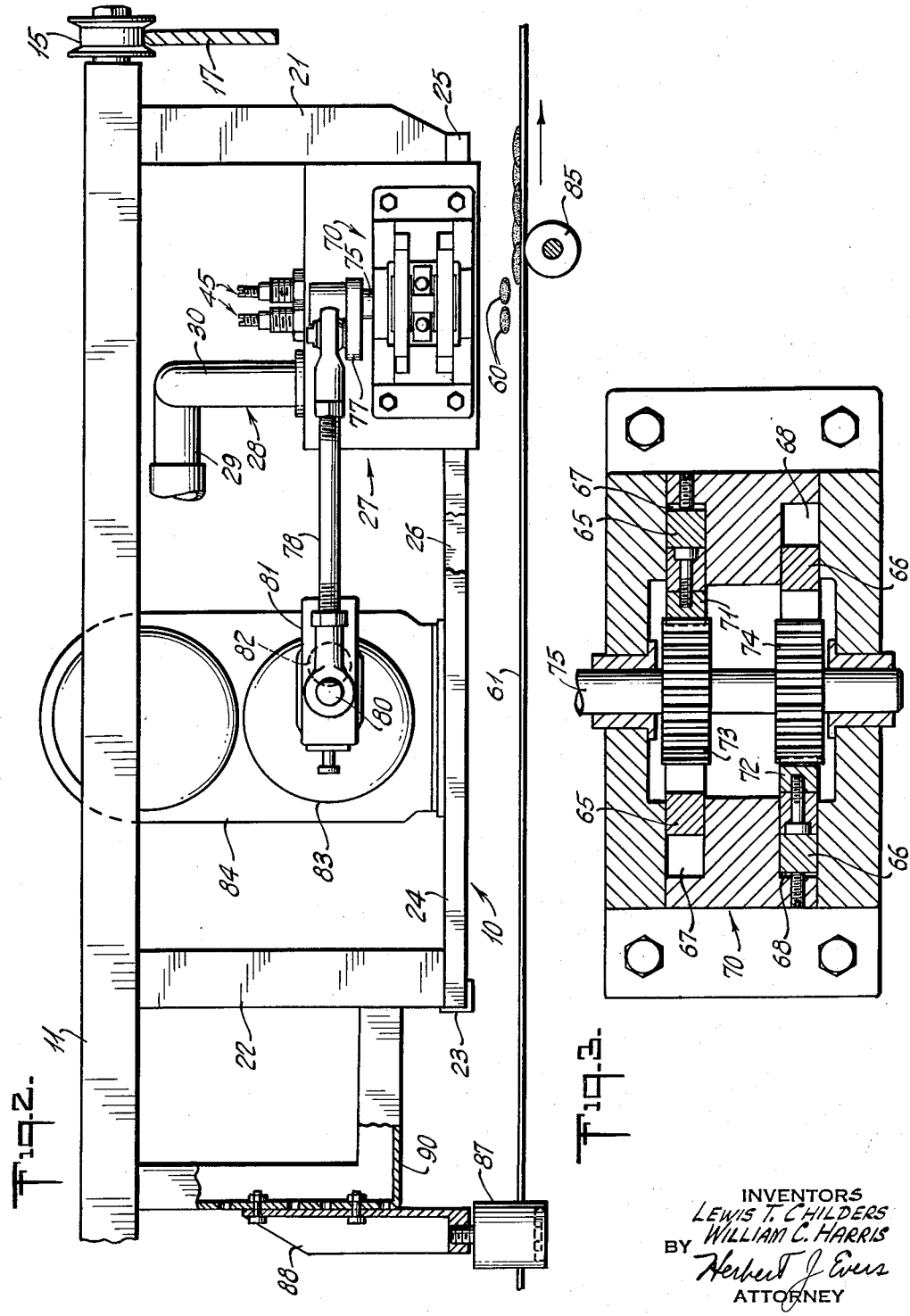

United States Patent Office 3,106,173
Patented Oct. 8, 1963

3,106,173
DEPOSITOR
William C. Harris and Lewis T. Childers, Austell, Ga., assignors to National Biscuit Company, a corporation of New Jersey
Filed Nov. 15, 1960, Ser. No. 69,452
15 Claims. (Cl. 107—29)

This invention relates generally to improvements in batter or dough depositing apparatus for commercial bakeries, and more particularly concerns an improved apparatus for periodically discharging uniform amounts of batter deposits.

Under the present day method of depositing cookie batter on a moving conveyor belt, several difficulties are encountered. One of the important problems is the deposition of uniform amounts of cookie dough on the belt. If the weight of the deposit is below standard, the weight of the package will be below the label-indicated weight. On the other hand, any increase in the weight of the deposit would significantly increase the cost of production. Consequently there is a need for a machine which will provide more uniform deposits of dough. The development of such a machine would tend to reduce the unit cost of production.

It is therefore an important object of the present invention to provide an improved dough depositing apparatus capable of uniformly depositing the dough on a moving belt in substantially uniformly weighed amounts.

Another object of the invention is to provide a dough deposit apparatus having means for adjustably controlling the volume of the individual deposit while the apparatus is in operation.

A further object of the present invention is to provide a deposit apparatus capable of handling batters and doughs of varying consistencies.

Yet another object of the present invention is to provide a dough deposit apparatus having means for self-centering the apparatus with respect to a moving conveyor belt in receiving relation thereto, whereby the dough deposits emanating from the apparatus are symmetrically arranged on said belt independently of the lateral, shifting movements thereof.

A further object of the invention is the provision of a novel combination of means for pressure feeding batter through discharge orifices in a depositing apparatus and a shearing mechanism operating in conjunction with the orifices whereby each discharge of dough batter from the apparatus is substantially uniform in weight and can be discharged at a high production rate.

Other objects, features and advantages of the present invention will be readily apparent from the following detailed description of an embodiment thereof taken in conjunction with the accompanying drawings in which:

FIG. 2 is a side elevational view, partly in section, of the apparatus shown in FIG. 1;

FIG. 3 is an enlarged sectional view of a shear plate rack gear drive taken on the line 3—3 of FIG. 1;

FIG. 4 is a perspective view of a section of the depositing head, showing details of construction;

FIG. 5 is a sectional view of a valve stem assembly taken on the line 5—5 of FIG. 4;

FIG. 6 is a view in perspective of a gear housing, with parts broken away, to illustrate the operation of a rack and pinion assembly for driving the double action shear plates;

FIG. 7 is a fragmentary sectional view taken on line 7—7 in FIG. 1 illustrating the selective adjustability of individual valve heads for controlling clearance over the discharge ports;

FIG. 8 is a fragmentary plan view of two shear plates, partially broken to show their relative positions when batter is extruded from the depositing head; and FIG. 9 is a view similar to FIG. 8, but showing the shear plates in their closed position.

Figure 1:
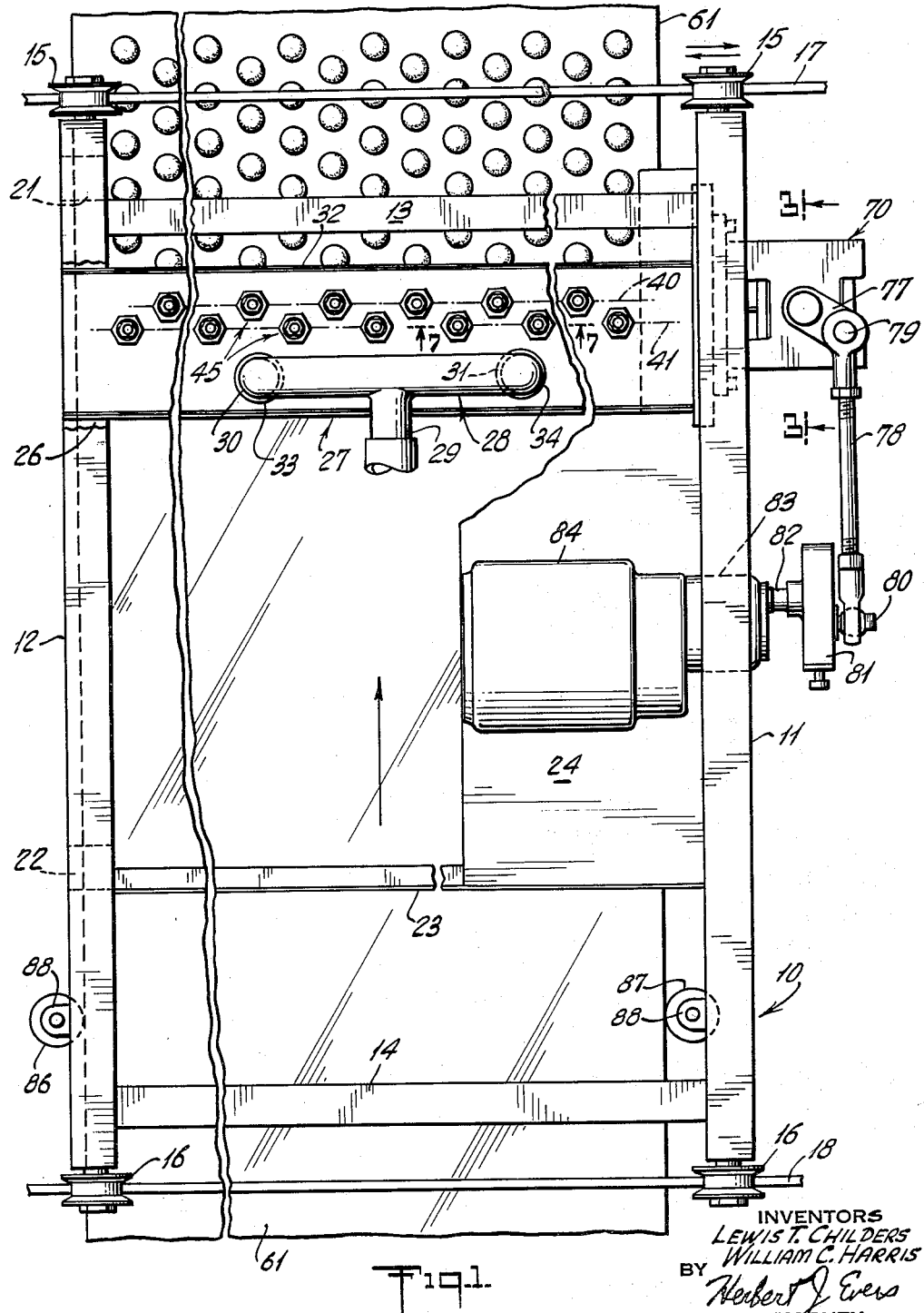
FIG. 1 is a plan view of the depositing apparatus illustrating the principles of the invention mounted over the traveling band of a baker's band oven.

Referring to the drawings, and particularly to FIGS. 1 and 2, there is indicated generally at 10 a depositor supporting frame, comprising side frame members 11 and 12 secured in spaced parallel relation by transverse members 13 and 14. Attached for rotation at each end of the side frame members 11, 12 are a pair of grooved rollers 15 and 16 adapted to ride on cross rails 17 and 18, respectively, supported on a suitable framework (not shown). Extending downwardly from one end of the side frame members 11 and 12 are left and right hand vertical members 21 secured at their lower ends by a transverse bracket 25. Similarly, the opposite ends of the side frame members 11, 12 are provided with vertical members 22 terminating in a transverse bracket 23. These brackets, 23, 25, constitute the end supports for an elongated horizontal platform 24, and a supporting beam 26 disposed parallel to said platform and in the vertical plane of the side member 12.

Supported securely on the horizontal platform 24 and extending over to and fixedly supported by the beam 26 is a depositing head indicated generally as 27. This apparatus is provided with a manifold 28 formed with a feed pipe 29 and branch outlets 30 and 31 which communicate with inlets 33 and 34, respectively, formed in the top of the depositing head 27, and through which batter is fed under constant pressure from a continuous mixing apparatus (not shown) suitably connected therewith as by a flexible hose and coupling.

As best shown in FIG. 4, the depositing head 27 comprises a hollow metal box divided into upper and lower chambers 35 and 36 by a partition wall 37 extending the entire length and width of the depositing head. The partition wall 37 is formed with a plurality of openings 38, preferably disposed in rows although any other suitable arrangement may be used if so desired. As illustrated herein, two rows of openings 38 are shown in staggered relation to one another. Similar rows 40 and 41 (FIG. 1) of holes are provided in the top wall 44 of the depositing head in registry with the holes 38. A corresponding group of registered openings 42 is formed in the bottom wall 43 (FIGS. 4 and 7) of the lower chamber 36.

Screw-threaded into each line of openings 40 and 41 in the top wall 44 of the depositing head 27 is a plurality of adjustable valve plugs 45, each of which is provided with a valve head 46 positioned above the openings 38 formed in the partition wall 37. These valve plugs 45 are adapted to control the flow of pressurized batter from the upper chamber 35 via the openings 38 into the lower chamber 36. The valve plugs 45 are each screw-threaded internally to receive a threaded valve stem 48 extending through the respective openings 38 in the partition wall 37, and terminating just short of the openings 42. Each valve stem 48 carries a valve head 50 which is adapted to be adjustably positioned in spaced relation to the opening 38 to control the discharge of batter therefrom.

Disposed beneath the double row of apertures 42 (FIG. 7), is an elongated recessed guideway 58 in which a pair of superposed shear plates or cutter blades, 51, 52 (FIGS. 6 and 7) slidingly fit. These plates are provided with apertures 53, 54, respectively, which can be moved into registered alignment with the openings 42.

Retention of the shear plates 51, 52 in the recessed guideway may be accomplished by suitably spaced retention plates 56, 57 attached securely with threaded screws 55 to the bottom wall 43 in such manner as to partially overlap the guideway, and at the same time straddle the side edges of the shear plates 51, 52.

The shear plates 51 and 52 are adapted to reciprocate oppositely to one another a sufficient distance to move the apertures 53, 54 into intermittent registry. As shown in FIG. 8, when the shear plates 51, 52 reach one limit of their reciprocal stroke, a conjunction of their respective apertures 53, 54, with the apertures 42 is effected to provide a passageway for the pressurized batter therethrough. When the shear plates 51, 52 are at the longitudinally diverted positions of their strokes, shown in FIG. 9, said apertures 53, 54 are out of registry, thus cutting off the flow of batter from the openings 42 in the depositing head. The shear plates 51 and 52 are each reciprocated a distance equivalent to one half diameter of the circular apertures formed therein, thus providing a full diameter opening when the plates are in their maximum open position as shown in FIGS. 6 and 8.

As a feature of the invention, provision is made for insuring the deposition of substantially circular deposits. For this purpose, the apertures 53, 54 (FIG. 6) are construed with a generally oval or elliptical shape, instead of a circular shape. The reason for this can be understood by referring to FIGS. 8 and 9, where it can be seen that shearing action of the plates 51, 52 across a batter deposit discharging through the apertures 53, 54 would tend to squeeze or compress the sides of the deposit thus producing an oval-shaped deposit onto the oven band. By elongating the apertures 53, 54 with the major axes of the resulting oval apertures extending transversely of the oven band, a substantially circular product is obtained.

Mechanism for reciprocating the shear plates is best seen in FIG. 6 wherein the shear plates 51 and 52 are shown seated in bifurcated holder blocks 62 and 63, respectively, and secured in position by screws 64. Each holder block is secured to a generally U-shaped rack frame, 65 and 66, which is adapted to slidingly move in oppositely disposed vertically spaced slideways 67, 68 provided in a gear housing 70. As shown in FIG. 1, the housing 70 is disposed at the right hand end of the depositing head 27 and secured in position by suitable bolts. Seated securely in each rack frame 65, 66 is a toothed rack 71, 72, meshing with a pinion 73, 74 respectively. As shown in FIGS. 3 and 6, the pinions 73 and 74 are vertically spaced on a rotatably mounted upright shaft 75, whereby clockwise rotation of the shaft 75 (as viewed in FIG. 6) will actuate the upper level rack 71 towards the right and the lower level rack 72 to the left. Similarly, counterclockwise rotation of the shaft 75 will produce a reverse motion of the racks. In this manner periodic reversal of the direction of rotation of the shaft 75 produces a reciprocating movement in the racks 71, 72, which can be translated into a scissors-like motion for the cutting edges of the apertures 53, 54 in the shear plates 51, 52, respectively.

Provision for imparting an intermittent reciprocating rotation to the shaft 75 resides in a linkage shown in FIGS. 1 and 2. This linkage comprises an oscillatable rocker arm 77 mounted on the shaft 75 by a spline or key 76 for rotation thereabout, a connecting rod 78 pivotally connected at one end to said rocker arm by pin 79 and pivotally joined at the other end to a rotating driver arm 81 by pin 80, and a drive shaft 82 which rotates the arm 81. The drive shaft 82 is suitably connected to a variable speed motor 84 through a gear reduction drive 83.

Referring now to FIG. 2, the steel conveyor belt or oven band 61 is suitably supported on rollers 85 to prevent sagging of the band due to its flexibility. It will be appreciated that any swaying or lateral shifting of the band 61 affects the placement of the cookie deposits thereon, causing some of the deposits to come too close to the edge. This is prevented in the present invention by means of centering rollers 86, 87 which straddle the belt 61. These rollers 86, 87 are carried by channel members 88 adjustably mounted on brackets 90 secured to the frame members 11 and 22, so that any lateral motion of the belt 61 is transferred to the supporting frame members 11 and 12, which through rollers 15 ride along the cross rails 17, 18. In this manner the depositing mechanism is self centered at all times with respect to the oven band 61.

*Operation*

The operation will be described in terms of a cooky batter or dough, but it is to be understood that other materials of a plastic nature, such as marshmallow, may be employed without departing from the scope of the invention. Cookie batter is supplied under constant pressure from a continuous mixer (not shown) to the feed pipe 29 of the manifold 28 (FIG. 1) through which it is distributed through inlets 33 and 34 into the upper chamber 35 (FIG. 4) of the depositing head 27. Since the amount of batter that is deposited is a function of pressure and opening size, the adjustment for fall-off in pressure at the extremities of the chamber 35 is made by suitably increasing the vertical distance of the valve plugs 45 above the openings 38. Corresponding adjustments are made in the intermediate valve plugs to equalize the pressure in the upper chamber in the area of the apertures. Means for individually adjusting the valve plugs is best shown in FIG. 4 wherein the upper extremity of each threaded plug 45 is illustrated with a milled or ground flat 91 for applying a wrench thereto, and a lock nut 92. With the above arrangement, material is fed from the upper to the lower chamber with uniform pressure and uniform distribution, assuring that the deposits through each opening 42 in the bottom wall 43 of the bottom chamber will be uniform as to volume and dimension.

Clearance between the valve heads 50 and the openings 42 in the bottom chamber may also be adjusted by raising or lowering the threaded screw 48 (FIG. 5), for which a milled slot 93 is provided. The valve head 50 is held in adjusted position by a lock nut 94. Individual adjustment of the valve stems 48 is best shown in FIG. 7 wherein each valve head 50 is raised to a different level.

From the foregoing description it will be seen that the present invention provides an improved dough depositor in which material is discharged in uniform quantities utilizing the combination of an adjusted uniform pressure and a pair of reciprocating shear plates. It will be noted that further control over the volume of batter in the deposit and in the spacing between rows of deposits on the oven band resides in adjusting the time interval for the shear plates 51, 52 to make one complete reciprocation to open and close the openings 42. This may be suitably accomplished by changing the speed of the motor 84 and adjusting the length of the connecting rod 78. A variable resistance (not shown) may be connected in series with the variable speed motor 84 to control its rate of speed and the consequent rate of reciprocation of the rocker arm 77. The throw of the rocker arm may be adjusted by manual rotation of a turnbuckle forming a part of rod 78, the left and right hand threads of which operate to shorten or lengthen the distance between the pin 80 on the rocker arm 81 and the pin 79 on the oscillatable rocker arm 77, thus increasing or decreasing, respectively, the angular magnitude of oscillation of the shaft 75 (see FIG. 6) which effects reciprocation of the shear blades 51, 52 through the pinions 73, 74 and the gear racks 71, 72.

It will be understood by those skilled in the art that numerous variations in the above described apparatus involving substitutions of substantial equivalents for the structures described are intended to be comprehended within the spirit of the present invention and that the invention is capable of extended application and is not confined to the precise constructions illustrated nor to the order in which the steps have been described and, therefore, such changes and modifications may be made therein as do not affect the spirit and scope of the invention.

We claim:

1. In a dough depositing apparatus having an extrusion chamber provided with a plurality of discharge openings, the combination of a source of dough under constant pressure operatively connected to said chamber to distribute dough therein, deposit control means associated with said discharge openings to selectively adjust the volumetric size of the dough deposits discharged from said openings, a pair of divergently reciprocable shear blades operable when in their maximum divergent position to seal said plurality of discharge openings against the discharge of dough therethrough, and operative when in their convergent position to uncover said openings for the discharge of dough therethrough, and operable when moving from their convergent position to their maximum divergent position to shear said dough deposits by progressive encirclement thereof.

2. In a depositing apparatus according to claim 1, wherein said deposit control means comprises a plurality of selectively adjustable valves disposed across said extrusion chamber for maintaining the discharge pressure of said dough uniformly through said plurality of discharge openings in said chamber.

3. In a depositing apparatus according to claim 1, wherein there is provided valvular means to control the pressure of said dough uniformly within said chamber and to control the individual volumetric size of each discharge of dough, said means being adjustable while said apparatus is in operation.

4. In a dough depositing apparatus, an extrusion chamber having a partition dividing said chamber into upper and lower compartments, a plurality of openings in said partition communicating from said upper to said lower compartment, an inlet for supplying flowable plastic material to said upper compartment, said lower compartment having a bottom wall, a plurality of discharge openings therein in registry with the openings in said partition, a pair of oppositely reciprocable shear blades associated with the openings in said lower compartment, said blades being reciprocable from a convergent position to a divergent position, said shear blades being operable when in said divergent position to seal said plurality of discharge openings against the discharge of material therethrough, and operative when in said convergent position to uncover said openings for the discharge of material therethrough, and valvular means for each of said openings in said partition for maintaining uniform pressure of the material in said lower compartment.

5. In a dough depositing apparatus according to claim 4, wherein there is provided deposit control means associated with said valvular means to selectively adjust the volumetric size of dough deposits discharged from said discharge openings.

6. In a dough depositing apparatus according to claim 4, wherein there is provided deposit control means associated with said valvular means to selectively adjust the volumetric size of dough deposits discharged from said discharge openings, said deposit control means being adjustable while said depositing apparatus is in operation.

7. In a dough depositing apparatus according to claim 4, wherein there is provided means integral with said valvular means to selectively adjust the volumetric size of dough deposits discharged from said discharge openings, said means comprising a retractable valve head for each of said openings in said partition for controlling the discharge of dough from said upper compartment to the lower compartment, each valve head having a central stem extending through the openings in said partition, and a valve head formed on each of said stems.

8. A cookie batter depositor for association with a traveling oven band comprising, an extrusion chamber having a row of discharge openings in a lower portion thereof, means for periodically opening and closing said discharge openings, said means including a pair of oppositely movable shear plates, a row of apertures cut in each of said shear plates cooperating with said discharge openings to seal said openings to prevent discharge of cooky batter therefrom when said movable shear plates are in one of their opposed positions, and acting to open said openings to the discharge of cookie batter therefrom when in another of their opposed positions, means for reciprocating said shear plates in opposite directions from one of their positions to another of said positions, an endless oven band adapted to support edible units of deposited dough batter, and means including a turnbuckle and a variable speed motor for controlling the amount and the rate of reciprocation of said shear plates whereby the equidistant intervals between transverse rows of batter deposits on said oven band may be increased or decreased.

9. A cooky batter depositor according to claim 8, including a frame for supporting said depositor above said oven band, and roller means supporting said frame for movement transversely across said oven band.

10. A depositor according to claim 8, wherein said shear plate apertures are elliptically shaped with the major axes thereof extending in a transverse direction with respect to the direction of movement of the oven band.

11. In a dough depositing apparatus for depositing plastic dough in a sequence of deposits of adjustably determined volume, a chamber having a plurality of discharge openings in a lower wall thereof through which dough is forced under constant pressure, a pair of divergently reciprocable shear blades which in one of its reciprocable positions seals the plurality of discharge openings against the discharge of dough therethrough, the shear blades when in their other reciprocable position permitting dough to be forced through the discharge openings, a partition plate dividing said chamber into upper and lower compartments, the dough under pressure being supplied to the upper compartment and then passed to the lower compartment through apertures in said partition plate, and an adjustable valve plug member associated with each of the apertures of said partition for subjecting a determined frictional drag on the dough passing through said apertures in order to maintain the dough within said lower compartment at a pressure which is substantially constant throughout the area of the lower wall of the chamber.

12. A dough depositing apparatus according to claim 11 in which an adjustable valve plug is associated with each of said discharge openings in the lower wall of the chamber for imposing a determined frictional drag on the dough forced out through said discharge openings in order to maintain the flow through each of the discharge openings at a rate which is closely similar to the rate of flow through each of the other discharge openings in said lower wall.

13. A dough depositing apparatus according to claim 12, in which each of said valve plug members is adjustable while the apparatus is in operation for varying the frictional drag imposed on the dough flowing through said discharge openings.

14. A dough depositing apparatus according to claim 11 in which said shear blades are arranged in superposed relationship, the upper and lower blades each having a row of apertures corresponding to and registering with the discharge openings of the lower wall of the chamber when the shear blades are in their said other position of reciprocation.

15. A dough depositing apparatus according to claim 11 in which the chamber is supported above an endless oven band, in which the shear blades are synchronized with the movement of the oven band whereby deposits of dough are extruded onto said band at predetermined equidistant intervals, and in which said depositor is supported for movement transversely of the direction of movement of the oven band, and is centered over the band by rollers tracking the longitudinal edges of said band.

References Cited in the file of this patent

UNITED STATES PATENTS

| | | |
|---|---|---|
| 774,204 | Sampson | Nov. 8, 1904 |
| 921,874 | McVitie et al. | May 18, 1909 |
| 1,524,922 | Formaneck | Feb. 3, 1925 |
| 1,605,609 | Perkins | Nov. 2, 1926 |
| 2,791,975 | Mendoza | May 14, 1957 |
| 2,963,995 | Brudi | Dec. 13, 1960 |